United States Patent
Copado

(10) Patent No.: US 7,524,525 B2
(45) Date of Patent: Apr. 28, 2009

(54) METHOD FOR MAKING REDUCED FAT POTATO CHIPS

(75) Inventor: Luis Fernando Trejo Copado, Dorado, PR (US)

(73) Assignee: Sabritas, S. de R.L. de C.V., Colonia Lomas de Chapultepec (MX)

( * ) Notice: Subject to any disclaimer, the term of this patent is extended or adjusted under 35 U.S.C. 154(b) by 501 days.

(21) Appl. No.: 11/240,959

(22) Filed: Sep. 30, 2005

(65) Prior Publication Data

US 2007/0077344 A1   Apr. 5, 2007

(51) Int. Cl.
  *A23L 1/217* (2006.01)
(52) U.S. Cl. ...................... 426/637; 426/438
(58) Field of Classification Search ................. 426/637, 426/438
  See application file for complete search history.

(56) References Cited

U.S. PATENT DOCUMENTS

| 3,865,563 | A | 2/1975 | Wright et al. |
| 4,277,510 | A | 7/1981 | Wickland |
| 4,537,786 | A | 8/1985 | Bernard |
| 4,608,262 | A | 8/1986 | Galland |
| 4,608,264 | A | 8/1986 | Fan et al. |
| 4,721,625 | A | 1/1988 | Lee et al. |
| 4,749,579 | A | 6/1988 | Haydock et al. |
| 4,917,919 | A | 4/1990 | Geisler et al. |
| 4,933,199 | A | 6/1990 | Neel et al. |
| 5,084,291 | A | 1/1992 | Burrows et al. |
| 5,391,384 | A | * | 2/1995 | Mazza ........................ 426/267 |
| 5,393,552 | A | 2/1995 | Busacker et al. |
| 5,484,617 | A | 1/1996 | Tiffany |
| 5,912,034 | A | 6/1999 | Martin et al. |
| 6,113,957 | A | 9/2000 | Mattinson et al. |
| 6,180,145 | B1 | 1/2001 | Ricks |
| 6,635,294 | B2 | 10/2003 | Keijbets |
| 2003/0183092 | A1 | 10/2003 | Barber et al. |

OTHER PUBLICATIONS

Harvey Wickes Felter, M.D. and John Uri Lloyd, Phr. M., Ph. D., 1898. ACACIA (U.S.P.)—ACACIA; King's American Dispensatory, 1898. Retrieved from Internet Mar. 29, 2005 website address http://www.ibiblio.org/html (pp. 1 to 6).

FAO Corporate Document Repository; Ch. 5 Procedure for Vegetables Preserved by Combined Methods; Retrieved from Internet Mar. 29, 2005 website address:http://www.fao.org/documents/show_cdr.asp?url_file=/DOCREP/005/Y4358E/y4358e08.htm (pp. 1 to 11).

* cited by examiner

*Primary Examiner*—Arthur L Corbin
(74) *Attorney, Agent, or Firm*—Colin P. Cahoon; Bobby W. Braxton; Carstens & Cahoon, LLP

(57) ABSTRACT

A method for making potato chips involving a marination step in a brine and acacia gum solution prior to frying. Potato pieces or slices are immersed for a short period of time in a brine solution that comprises soluble acacia gum. This immersion marinates the potato pieces prior to a frying step. The resultant potato chips, after frying, have a reduced fat content but exhibit otherwise very similar characteristics to a potato chip made by prior art frying methods.

8 Claims, 1 Drawing Sheet

METHOD FOR MAKING REDUCED FAT POTATO CHIPS

BACKGROUND OF THE INVENTION

1. Technical Field

The present invention relates to an improved method for the production of potato chips and more particularly to a method for making potato chips which are similar in taste and texture to prior art potato chips produced by a traditional process but with less fat content.

2. Description of Related Art

Commercial production of potato chips typically involves a continuous process wherein sliced potatoes are continuously introduced into a vat of frying oil at a temperature of about 365° F. (about 185° C.) or higher, conveyed through the oil by paddles or other means, and removed from the oil after about two and one-half to three minutes of frying by an endless conveyor belt when the moisture content of the chips has been reduced to about 2% by weight or less. The resulting product generally has texture and flavor characteristics which are usually recognizable by consumers as typical commercially produced continuous process potato chips.

The typical steps used in making prior art potato chips in this manner involve first peeling the potatoes, then slicing the potatoes, washing and/or blanching the potato slices, drying the potato slices, and then frying the potato slices by emersion in an edible oil or fat heated at an appropriate temperature. After frying, the potato chips can be seasoned with salt and other seasonings and packaged for sale to consumers. Potato chips manufactured in this way typically comprise 30% to 40% or even higher fat content by weight. This fat is picked up during the frying process when the chips are immersed in edible oil or fat and cooked.

The oil content of potato chips is important for many reasons. Most important is its contribution to the overall organoleptic desirability of potato chips, however from the standpoint of good nutrition, it is desirable to maintain a low level of oil or fat in chips. Further, a high oil content renders the chips greasy or oily and hence less desirable to consumers. On the other hand, it is possible to make chips so low in oil that they lack flavor and seem harsh in texture. A happy medium can be achieved by reducing the oil content in a chip so that the objectives of using less oil is met and consumers interested in reducing their intake of both fats and calories can be satisfied with an organoleptically pleasing snack food.

Numerous attempts have been made in the prior art to reduce the oil content in potato chips. Some attempts involve pre-treating the potato slices prior to frying. Other attempts involve treating the chips after frying, and some attempts use both pre- and post-treatments. However, past attempts at producing lower oil content chips are either expensive, or have failed to maintain the desired organoleptical properties such as taste and texture that have become familiar to consumers of traditional potato chips having higher fat or oil contents.

For example, U.S. Pat. No. 4,749,579 teaches a process for producing potato chips having a fat content lower than 32% by weight. The '579 Patent discloses a pre-treatment process whereby potato slices are washed in a salt or brine solution. The potato slices are dried and potato slices are pre-heated with infrared radiation prior to being sent to the fryer. This process however has been proven to reduce fat in the end product very inconsistently. The '579 Patent even discloses that the resultant chip has a fat content in the range of 26% to 32% by weight compared with a prior art oil content of 38%. Further, the '579 Patent requires an infrared radiation step, thus adding equipment and processing expenses.

Another prior art attempt for making a low oil potato chip by pre-fry treatment is disclosed by U.S. Pat. No. 4,917,919, which teaches coating a potato chip with an aqueous, polyvinylpyrrolidone. Unfortunately, the moisture content of the finished product is about 4% by weight, raising concerns of shelf stability.

U.S. Pat. No. 4,933,199, assigned to the same Assignee as the present invention, involves treating a fried potato chip in a de-oiling unit to lower the oil content of the chip and further treating the chip in a dehydrating unit to lower the moisture content of the chip. Unfortunately, each unit operation can add substantial capital costs as well as operating cost to the process. Further, the '199 Patent indicates that attempting to de-oil potato slices to produce low oil potato chips and simultaneously arrive at a desired final moisture content has been found to be difficult to achieve in the same unit. The '199 Patent indicates that optimized de-oiling and optimized final moisture content are not arrived at simultaneously.

Similarly, U.S. Pat. No. 4,721,625 uses a post-fry saturated steam treatment to reduce the oil content of the potato slices. A saturated steam blasting process, however, generally results in a pick up of moisture by the cooked slices due to condensation. As a result, the cooked slices require a subsequent drying unit operation. As previously indicated, this subsequent drying operation involves substantial economic capital and operating outlays.

Another prior art solution to making a low oil potato chip is illustrated by U.S. Pat. No. 4,537,786, also assigned to the same Assignee as the present invention. The '786 Patent teaches that thicker than normal slicing can reduce oil uptake during frying. The '786 Patent process discloses: frying potato slices in oil at a lower than normal temperature of between about 280° F. and 320° F., removing the potato slices from the fryer when the moisture content is about 3% to about 15% by weight, orienting the potato slices on edge, and contacting the fried potato slices for about 1 to about 10 minutes with a stream of hot air. This hot air removes the excess oil as well as finishes cooking the chip. However, hot air tends to accelerate oxidation of the oil reducing shelf life dramatically.

Another prior art solution for a low oil potato chip is disclosed in U.S. Pat. No. 4,277,510, a process for making low oil potato chips by drying the slices in a monolayer, contacting the resultant dried potato slices with steam, and frying the steam-treated potato slices. Unfortunately, according to U.S. Pat. No. 4,721,625 (discussed above), the pre-drying of the product in the '510 Patent results in a glassy texture, case hardened product that has a raw, green flavor, which is different in taste and texture from regularly fried potato chips.

Several other efforts have been made to reduce the fat in potato chips by limiting the exposure to frying in oil and even by baking the chips and then seasoning them to attempt to produce a chip that is acceptable to consumers used to eating fried potato chips. These efforts have met with limited success, often involving expensive non-traditional processing steps or resulting in a product that does not provide similar desirable characteristics as compared to a fried potato chip.

Consequently, there is a need in the industry for an efficient process for making a reduced-fat potato chip which uses existing equipment, adds little to the cost of producing the chip, yet produces a potato chip that is quite similar in characteristics to a potato chip produced by a standard prior art method.

SUMMARY OF THE INVENTION

The invention provides a method for making potato chips using standard equipment used in this industry, with little additional cost, that produces a potato chip having a reduced fat content, but is otherwise very similar to potato chips made by standard prior art methods. The instant invention involves a marination step that occurs prior to a prior art frying step. This marination step occurs in a brine solution to which acacia gum has been added. The sliced potato chips or pieces are marinated in this brine and acacia gum solution for, in one embodiment, approximately 9 to 14 seconds before being dried and fried in accordance with prior art methods. The resultant potato chip, in one embodiment, consistently contains by weight approximately 24.5% fat, which is a 25% or better reduction in the fat of the chip as compared to chips made without the marination step. The equipment used for the marination step can be the same equipment used for blanching sliced chips in water. In an alternative embodiment, the marination step with the brine and acacia gum solution can take the place of a blanching step, thus producing one processing step. The present invention provides a more economical method for making potato chips by a continuous method having desirable texture and taste properties with reduced fat content.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
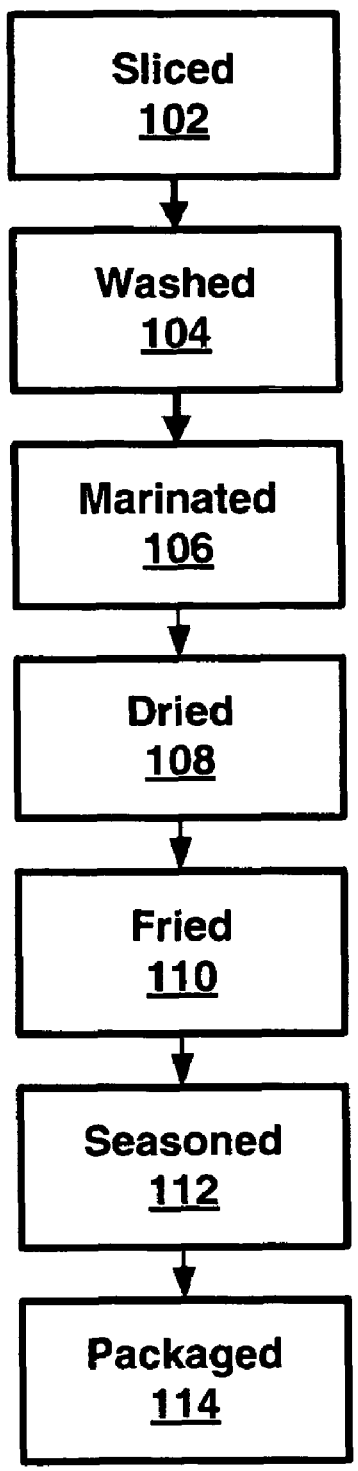
FIG. 1 is a schematic representation of the method step of one embodiment of the present invention.

An embodiment of the innovative invention will now be described with reference to FIG. 1. FIG. 1 is a schematic representation of the method step of one embodiment of the present invention. Raw potato stock is first sliced 102 (this can include a separate peeling step prior to the slicing step or the skin can be retained on the potato during the slicing step) in accordance with prior art techniques and using prior art equipment. These sliced raw potato pieces are then washed 104 during a washing and/or blanching step. Again, this washing step 104 occurs using prior art equipment using prior art methods and techniques. For example, one suitable slice washer is the "Potato Slice Speed Washer" or the "Gentle Wash" supplied by Heat & Control, Inc. The potato slices are then transported, typically via conveyor, to the marination step 106. If desired, excess moisture adsorbed to the surface of the potato slices can be removed between the washing 104 and marination 106 steps. Excess moisture removal can be accomplished using prior art de-watering devices and techniques such as drip-drying along a perforated belt conveyor or surface, and/or blasting air (which can be heated for greater effect) across or upon the surface of the potato slices. Example de-watering devices suitable for the instant invention include the "Air Knife" and the "Air Sweep® Water Removal System" supplied by Heat & Control, Inc.

In one embodiment, for example, the marination step 106 applies an aqueous brine solution in a controlled manner that allows the food to obtain a crispy texture. The brine application system can be a continuous flow of brine that is then discharged, or such flow of brine can be recycled and either continuously replenished or replenished by batch. Such flow of brine can be either concurrent or countercurrent with respect to the direction of movement of the potato pieces.

If desired, a brine application system, which can be used in addition to or in combination with a slice-washing step, can also be used wherein substantially no effluent by-product is created. One such example is described in co-pending U.S. application Ser. No. 10/109,059 and published in Publication No. US 2003/0183092 for Barber et al., which application has been assigned to the same Assignee as the current invention. For instance, Barber et al. teach that potato slices are supplied in a continuous stream to one or more water baths in order to remove excess surface starch from the slices. Water is discharged from the bath and, if desired although not necessary, is passed through a filter and starch recovery system. The washed slices are removed from the bath by a conveyor system. An air knife system, including a blower fan and a vacuum fan, is disposed adjacent the conveyor system to remove excess surface moisture (i.e., water) from the slices being removed from the bath. The washed slices are then supplied to a brine bath tank containing an amount of brine solution having a specific concentration of a chloride compound, for example, NaCl. The chloride compound concentration of the brine solution in one particular embodiment is about 4% NaCl, where the concentration is determined as grams per liter (i.e., kilogram) of water. The chloride compound concentration, however, can vary depending on the characteristics of the raw potato used and the desired end product. The residence time that the slices spend marinating in the brine bath tank in order to assure proper wetting of the slices by the NaCl solution is on the order of a few seconds. Subsequently, the potato slices exit the brine bath tank with a surface moisture of 20-25% by weight of potato slice in the form of surface brine solution. NaCl is replaced in the brine bath tank by adding a 25-26% saturated NaCl solution to the tank at a rate of about a gallon per minute. The slices then pass through an air knife system, which takes the surface moisture of the marinated slices down to 14-16% by weight of the potato slices. The turnover rate for the brine bath tank in this particular embodiment is about 35 minutes, but this may vary. Peroxyacetic acid is added in a 15% solution to the brine bath tank to maintain a preferred concentration of at least about 5 ppm and preferably at least about 15 ppm. The slices are then fried into chips preferably having a NaCl content of about 3% by weight of the chip due to the application of the brine solution. The amount of NaCl on the finished chips is controlled by controlling the concentration of NaCl in the brine bath tank and by controlling the amount of surface solution removed from the marinated slices by the air knife system.

The marination step 106 in the instant invention involves subjecting the potato slices to an aqueous brine solution to which acacia gum has been added as well. In one embodiment, the potato slices fall into the brine solution on a moving, perforated belt or conveyor, which belt then removes the potato slices from this brine solution shortly thereafter. Any product-submerging, product-washing, or other solid-and-liquid interfacing devices can be used in the marinating step 106. Furthermore, if desired, the device for marinating can be identical to the device used in the washing step 104. Example devices suitable for the marination step 106 include the "Potato Slice Speed Washer" and the "Gentle Wash" supplied by Heat & Control, Inc. Such marinating systems may also provide for starch filtration and liquid recycle.

In a preferred embodiment, the brine solution comprises an aqueous solution containing NaCl in amounts ranging from about 1% by weight to an amount which saturates the aqueous solution with the NaCl. In a preferred embodiment, the amount of NaCl in the aqueous solution ranges from about 3.5% by weight to about 4% by weight. The brine solution also comprises acacia gum, which is a food grade material that is highly soluble in water and is also referred to as arabic gum. In a preferred embodiment, the acacia gum in a powdered form is added to the brine solution after the addition of the NaCl in an amount up to 10% by weight of acacia gum to the aqueous solution. A preferred concentration of the acacia gum in the brine solution is between about 3% by weight to about 6% by weight. A most preferred embodiment of the invention involves a weight percentage of the acacia gum in the brine solution of about 4% to about 5%. Given a weight concentration of about 4% to about 5% acacia gum in the brine solution, the marination step 104, in a preferred embodiment, involves immersing the sliced potato pieces in the brine/acacia solution for about 5 seconds to about 20 seconds, or, more preferably, for about 9 seconds to about 14 seconds. In an alternative embodiment, the potato pieces can be washed and/or blanched during the marination step 106, rather than during a separate step 104. The marination step 104 is simply performed at ambient temperature, but warmer temperatures or cooler temperatures may be used alternatively. In fact, an elevated temperature of the brine solution may help the potato cells better absorb the salt and acacia gum. Marinating at ambient temperature, however, preserves energy and additional expense that would otherwise be necessary to heat and/or cool the brine solution.

Note that the term "acacia gum" as used in the instant application refers generally to the exudate of the acacia tree and its related species. Synonyms for acacia gum include, but are not limited to: gum Arabic; gum acacia; gum mimosa; gummi mimosae; gummi arabicum. Varieties of acacia gum include, but are not limited to: Senegal gum; Morocco gum, also called Mogador or Barbary gum; Cape gum; Australian gum, also called Wattle gum; India gum, also called East India gum; Suakin gum, also called Savakin gum, Talca or Talha gum; Sennaar gum, also called Sennari gum; Mezquite gum; Hogg gum, also called Doctor gum; Chagual gum. Acacia gum is largely composed of calcium arabate and includes a mixture of salts of calcium, magnesium, and potassium. These salts result from the combination of those elements with Arabic acid. In a preferred embodiment, the acacia gum has been purified using only physical methods and no extraction processing, no chemical modification, and no enzymatic modification.

In a preferred embodiment, the particular variety and brand of acacia gum used is the "Fibregum Standard IRX 60487" supplied by Colloides Naturels de Mexico, S.A. de C.V. Empresa Subsidiaria de Coloïdes Naturels International. The Fibregum Standard IRX 60487 is derived from purified and spray-dried acacia fibre, and its properties, as measured under the AOAC method, are as follows:

| pH - MO 4.10.31 | Solution at 25% in water | 4.1-4.8 |
| --- | --- | --- |
| Total ashes - MO 4.10.46 | Maximum | 4% |
| Viscosity - MO 4.10.57 | Solution at 25% in water at room temperature, measure with Brookfield LVF 60 rpm | 60-130 cP |
| Colour - MO 4.10.73 | Solution at 25% in water, measured with Loyibond, maximum | 15 |
| Total plate county - MO 4.10.15 | Maximum | 5000/g. |

Note, however, that while a preferred embodiment uses acacia gum with the properties described above, other varieties of acacia gum are also suitable for the instant invention.

The remainder of the steps involved in the invention again involve prior art methods using prior art equipment. After leaving the marination step 106, the potato pieces are then dried or otherwise de-watered 108 (meaning some of the surface water is removed) using prior art methods, such as blowing the pieces with a fan to allow some de-watering of the pieces prior to the frying step 110. For example, one suitable de-watering device is the "Air Sweep® Water Removal System" supplied by Heat & Control, Inc., which provides a vacuum beneath the perforated conveying belt (for pulling superficial moisture away from the product) in addition to an air blower above the belt (also for removing superficial moisture from the product). The potato pieces are then fried 110 and seasoned 112 before being packaged during a packaging step 114. The resultant product given the parameters detailed for a preferred embodiment is a potato chip having a fat content of about 24.5% by weight. Chips made using identical processing steps without the marination step typically have a fat content of about 33% by weight. This is a substantial reduction in the fat of a potato chip using a simple and inexpensive method without adversely affecting the color, taste, and organoleptic properties of the final product. The reduction in fat content has been found to be consistent and is attributed to the combination of the exposure to both NaCl and acacia gum, as a marination step in NaCl alone results in inconsistent fat levels in the final product.

While the invention has been particularly shown and described with reference to a preferred embodiment, it will be understood by those skilled in the art that various changes in form and detail may be made therein without departing from the spirit and scope of the invention.

What is claimed is:

1. A method for making potato chips comprising the steps of:
    a) slicing raw potato stock to produce potato pieces;
    b) marinating said potato pieces in a brine solution comprising at least about 3% by weight acacia gum; and
    c) frying said potato pieces to a moisture content of about less than 2% after the marination step b).

2. The method of claim 1 wherein said brine solution comprises up to 10% by weight acacia gum.

3. The method of claim 1 wherein said brine solution comprises about 3% to about 6% by weight acacia gum.

4. The method of claim 1 wherein said brine solution comprises about 4% to about 5% by weight acacia gum.

5. The method of claim 1 wherein said marination step comprises immersing said potato pieces in said brine solution for between about 5 and about 20 seconds.

6. The method of claim 1 wherein said marination step comprises immersing said potato pieces in said brine solution for between about 9 and about 14 seconds.

7. The method of claim 1 wherein the acacia gum is added to the brine solution in a powdered form.

8. The method of claim 1 wherein said brine solution further comprises about 3.5% to about 4% by weight sodium chloride.

* * * * *